US006404535B1

(12) United States Patent
Leight
(10) Patent No.: US 6,404,535 B1
(45) Date of Patent: Jun. 11, 2002

(54) OPTICALLY IMPLEMENTED WIDEBAND COMPLEX CORRELATOR USING A MULTI-MODE IMAGING DEVICE

(75) Inventor: James E. Leight, Los Angeles, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/203,185

(22) Filed: Nov. 30, 1998

(51) Int. Cl.[7] ........................................ G02F 1/33

(52) U.S. Cl. ...................... 359/306; 359/181; 359/561; 708/816; 364/728.03

(58) Field of Search ................................ 359/181, 306, 359/561; 708/816; 342/424; 364/728–803

(56) References Cited

U.S. PATENT DOCUMENTS

| | | | | | |
|---|---|---|---|---|---|
| 4,110,016 | A | * | 8/1978 | Berg et al. | 359/306 |
| 4,426,134 | A | * | 1/1984 | Abramovitz et al. | 359/306 |
| 5,121,248 | A | * | 6/1992 | Mohon et al. | 359/306 |
| 5,420,826 | A | * | 5/1995 | Abramovitz et al. | 359/306 |
| 5,477,382 | A | * | 12/1995 | Pernick | 359/559 |
| 5,903,390 | A | * | 5/1999 | Kane et al. | 359/561 |

OTHER PUBLICATIONS

M. Bachmann, P. A. Besse, and H. Melchior, "General self–imaging properties in N x N multimode interference couplers including phase relations," Jun. 20, 1994, vol. 33, No. 18, Applied Optics, pp. 3905–3911.

N. Ross Price, Phillipp P. Kronberg, Keigo Iizuka, and Alois P.Freundorfer, "Linear electro–optic effect applied to a radio astronomy correlator," Radio Science, vol. 31, No. 2, pp. 451–458, Mar.–Apr. 1996.

* cited by examiner

*Primary Examiner*—Knife-Michael Negash
(74) *Attorney, Agent, or Firm*—Harness, Dickey & Pierce P.L.C.

(57) ABSTRACT

An optically implemented wide bandwidth correlation system (10) that employs a multi-mode imaging device (42) and a particular modulation format to provide both in-phase and quadrature phase correlation components in a single correlation process. The correlation system (10) includes an optical source (12) that generates a laser beam (14) that is split into a first beam path (18) and a second beam path (20). The first split beam and a first electrical signal are applied to a first modulator (22) in the first path (18) and the second split beam and the second electrical signal are applied to a second modulator (24) in the second path (20). The modulated beams are then applied to the optical imaging device (42) that causes the beams to interfere with each other within an optical cavity (48). Four optical outputs are connected to the optical cavity (48) at strategic locations to provide a zero phase output and a π phase output that represent the in-phase correlation component, and a π/2 quadrature phase output and a 3π/2 quadrature phase output that represent the quadrature phase correlation component. A photodetector (60–66) detects each of the output signals from the imaging device (42) to provide electrical signals indicative of the phase outputs. A first differential amplifier (68) receives the electrical signals of the in-phase component and a second differential amplifier (70) receives the electrical signals of the quadrature phase component. The differential amplifier outputs are applied to separate integrators (72,74) to sum the signals for the correlation process. The modulators can be Mach-Zehnder interferometer modulators to provide a single sideband suppressed carrier modulation so that the in-phase and quadrature phase correlation components can be simultaneously generated.

24 Claims, 1 Drawing Sheet

OPTICALLY IMPLEMENTED WIDEBAND COMPLEX CORRELATOR USING A MULTI-MODE IMAGING DEVICE

GOVERNMENT LICENSE

Pursuant to Contract No. F30602-97-C-0054 awarded by the Defense Advanced Research Project Agency (DARPA), the government may have a paid-up license in this invention and the right in limited circumstances to require the patent owner to license others on reasonable terms.

BACKGROUND OF THE INVENTION

1. Field of the Invention

This invention relates generally to a system for correlating electrical signals and, more particularly, to an optical system for simultaneously performing both in-phase and quadrature phase correlation of wide bandwidth electrical signals using a multi-mode imaging device and a predetermined modulation format.

2. Discussion of the Related Art

The need to correlate electrical signals is an important operation for certain signal processing systems. The correlation of electrical signals is a mathematical procedure that causes two or more input signals to be aligned and then compared to provide increased signal processing gain and sensitivity. By aligning the signals in time, and then multiplying (mixing) and integrating the signals, the amplitude of the combined signals will significantly increase. This allows weaker signals to effectively be separated from receiver noise. By identifying peaks in signal intensity from the correlation process, a delay between the signals being correlated can be identified to align the signals. This gives the delay between signals from a common source that are received by receivers separated in space. Examples of systems that require correlation of electrical signals include passive millimeterwave (PMMW) imaging systems, nulling antenna signal processing systems, and RADAR return signal and processing systems. Matched filter correlation and processing of wideband pulsed or spread spectrum signals can be useful for pulsed or digital communications.

State of the art correlation systems include analog and digital systems that provide point-to-point analysis of two or more electrical signals. For an analog correlation system, the input signals are multiplied (mixed) on a time-by-time basis and the product is integrated. For a digital correlation system, the input signals are multiplied on a sample-by-sample basis and then summed to provide the correlation. Optical systems are also known that correlate radio frequency or electrical signals. Conventional opto-electronic correlators typically employ acousto-optical Bragg cells that receive an optical reference beam and the RF signal to be correlated. Additional optical processing elements are used to provide the actual multiplication and integration of the optical signals to provide the correlation. The article N. Ross Price et al., "Linear electro-optic effect applied to a radio astronomy correlator," Radio Science, V. 31, No. 2, March-April 1966, pgs. 451–458 discloses a known opto-electronic correlator.

The known correlation processing systems have heretofore been acceptable for providing correlation of two or more electrical signals within a relatively narrow bandwidth that does not have an appreciable spectral content. Such known correlation systems have not been able to provide efficient correlation above about 1 GHz, and thus their performance is limited for providing correlation of relatively wideband electrical signals. For conventional RF analog correlators, the correlation bandwidth is limited by the power divider, 90° hybrid coupler, and mixers, as well as the size, weight, and DC power required for the hardware associated with a single correlation. RF digital correlators require a significant amount of hardware and/or DC power to operate on bandwidths greater than 150 MHz, and the maximum bandwidth that can be quantized and sampled by the known processing circuitry, such as analog-to-digital converters.

In order to provide the correlation of signals having wide bandwidths, it was necessary in the art to -combine multiple correlation systems, where the input signals were split into separate channels for each separate correlation process. Multiple correlation processes significantly increases the system hardware, and adds additional noise into the processing system that results in a degraded final correlation of the entire signal. Additionally, most electrical signals to be correlated include a sine and cosine component that provided separate in-phase (real) and quadrature phase (imaginary) correlation components. In order to provide correlation for both components, it has been necessary in the art to provide distinct correlation processes to separately correlate the two components to provide both magnitude correlation and phase correlation. The correlation of the two separate signal components also adds significant hardware to the correlation processing circuitry.

Many applications exist in the art that would greatly benefit from the correlation of electrical signals having a wider bandwidths, for example, on the order of 3–10 GHz. These applications would also benefit from a reduction in system hardware to provide a reduction in size and weight requirements. It is therefore an object of the present invention to provide a correlation system operable at relatively wide bandwidths without the need for redundant correlation hardware.

SUMMARY OF THE INVENTION

In accordance with the teachings of the present invention, an optically implemented wide bandwidth correlation system is disclosed that employs a multi-mode imaging device and a particular modulation format to provide both in-phase and quadrature phase correlation components in a single correlation process. The correlation system includes an optical source that generates a laser beam that is split into a first beam path and a second beam path. The first split beam and a first electrical signal are applied to a first modulator in the first path, and the second split beam and the second electrical signal are applied to a second modulator in the second path. The modulated beams are then applied to the optical imaging device, such as a multi-mode imager, that causes the beams to interfere with each other within an optical cavity. Four optical outputs are connected to the optical cavity at strategic locations to provide a zero phase output and a $\pi$ phase output that represent the in-phase correlation component, and a $\pi/2$ quadrature phase output and a $3\pi/2$ quadrature phase output that represent the quadrature phase correlation component. A photodetector detects the output signals form the imaging device to provide electrical signals indicative of the optical outputs. A first differential amplifier receives the electrical signals for the in-phase component and a second differential amplifier receives the electrical signals for the quadrature phase component. The differential amplifier outputs are applied to separate integrators to sum the signals for the correlation process.

In one embodiment, the modulators employ a Mach-Zehnder interferometer modulator, to provide one of a single sideband suppressed carrier modulation, a double sideband suppressed carrier modulation, a single sideband with carrier modulation, or a double sideband with carrier modulation depending on the particular design. To simultaneously provide both the in-phase and quadrature-phase correlation components by the single imager, the single sideband suppressed carrier modulation format is employed.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
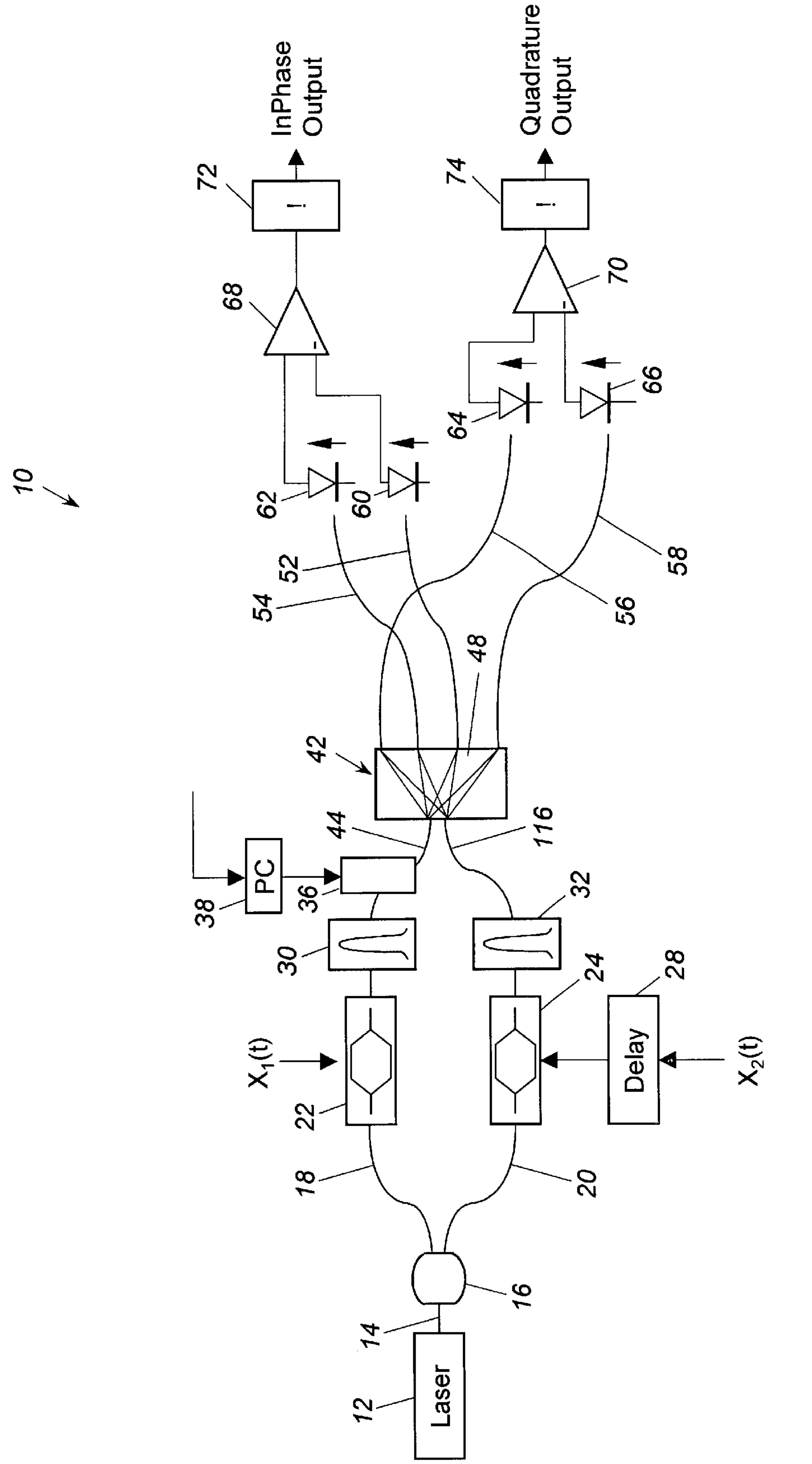
FIG. 1 is a schematic diagram of the signal processing architecture for a wide bandwidth optical correlator, according to an embodiment of the present invention.

The following description of the preferred embodiments directed to an optical correlator incorporating a multi-mode imaging device is merely exemplary in nature, and is in no way intended to limit the invention or its applications or uses.

FIG. 1 is a schematic diagram of an optical correlator 10, according to an embodiment of the present invention. The correlator 10 includes a laser 12 that generates a laser beam 14. The laser 12 can be any suitable laser for the purposes described herein, such as an electronically tunable distributed Bragg reflector (DBR) laser or a fixed wavelength distributed feedback (DFB) laser, known to those skilled in the art. The laser beam 14 is amplified and sent to an optical splitter 16 that splits the laser beam 14 into a first split beam propagating along a first optical path 18 and a second split beam propagating along a second optical path 20. The first and second optical paths 18 and 20 can be defined by any suitable optical waveguide for the purposes of the present invention, such as a fiber optic cable or semiconductor waveguide layers formed in a semiconductor structure, as would be appreciated by those skilled in the art. The optical splitter 16 can be any optical splitter suitable for the purposes described herein, such as a multi-mode imaging device or 1:N star coupler, known in the art.

A first modulator 22 is positioned in the first optical path 18 and a second modulator 24 is positioned in the second optical path 20 so that they receive substantially the same optical signal. The modulators 22 and 24 can be any suitable optical modulator, such as electro-absorption module (EAM) or a Mach Zehnder interferometer, that receive an electrical signal that is used to modulate an optical carrier wave, here the split laser beam 14. An electrical signal $X_1(t)$ is applied to the modulator 22 and an electrical signal $X_2(t)$ is applied to the modulator 24 to modulate the same optical carrier signal. The electrical signals applied to the modulators 22 and 24 are the two signals that are to be correlated. The electrical signals $X_1(t)$ and $X_2(t)$ are signals collected from the observed scene by a suitable antenna element (not shown) and are applied to a low noise amplifier (not shown) prior to being sent to the modulators 22 and 24. For a PMMW imaging system, the signals $X_1(t)$ and $X_2(t)$ can be downconverted from the millimeterwave frequency to a convenient intermediate frequency. The modulators 22 and 24 may be located proximate the antenna elements, and connected to the correlation system 10 by suitable optical fibers or the like.

In this example, the electrical signal $X_2(t)$ is applied to a delay device 28 that delays the signal $X_2(t)$ a predetermined period of time so that it is aligned with the signal $X_1(t)$ to provide signal peak alignment. The delay device 28 may be a true time-delay element associated with the antenna element to align the electrical signals $X_1(t)$ and $X_2(t)$, such as necessary in the conventional correlation operation. Alternately, the delay can be provided in one of the optical paths 18 or 20, typically after the modulator 22 or 24, by lengthening the path 18 or 20, as would be appreciated by those skilled in the art.

The modulated optical signals from the modulators 22 and 24 are stabilized at zero-bias by minimization or control to a desired level of the second harmonic of a low frequency analog bias dither or digitally encoded signal. This bias configuration provides optical carrier suppression. A fiber Bragg grating filter can be used for low sideband suppression of the modulated signals. A sideband filter 30 positioned in the optical path 18 and a sideband filter 32 positioned in the optical path 20 provide the zero-bias stabilization and the optical carrier suppression. In a particular embodiment, the signals $X_1(t)$ and $X_2(t)$ are single sideband amplitude modulated onto a coherent optical carrier by minimum biasing a Mach-Zehnder modulator. The input signals $X_1(t)$ and $X_2(t)$ perturb one of the arms of the interferometer within the modulator to provide constructive or destructive interference. If the interferometer is set to have a quadrature bias, then a double sideband with carrier modulation is performed. If the interferometer modulator is set for minimum bias, a double sideband with suppressed carrier modulation is performed.

A path length stretcher 36, such as a piezoelectric fiber stretcher or an electro-optic phase modulator, is positioned in the optical path 18 after the filter 30, and provides phase control calibration for maintaining optical coherence between the optical signals travelling along the path 18 and 20. Phase changes to the optical signals may be caused by thermal and acoustic variations to this system 10. In other words, it is important that the modulated optical beams travelling through the paths 18 and 20 remain coherent during environment changes for proper optical correlation, and thus the lengths of the paths 18 and 20 relative to each other must be controlled. To provide this control, a feedback signal from the correlation process is applied to a phase control device 38, such as a feedback control circuit or microprocessor, that sends a signal to the stretcher or phase modulator 36 to increase or decrease the path length of the optical path 18 to provide the fine tuning phase control between the paths 18 and 20. The feedback signal to the phase control device 38 may be any type of dithering or otherwise encoded analog or digital signal that is indicative of the phase relationship of the modulated optical beams originating in the paths 18 and 20.

The modulated split laser beams 14 on the optical paths 18 and 20 are applied as inputs to a multi-mode imaging device 42 of the type known to those skilled in the art. A discussion of an N×N multimode imager can be found in Bachmann, M. et al., "General self-imaging properties in N×N multimode interference couplers including phase relations," Applied Optics, Vol. 33, No. 18, Jun. 20, 1994, pgs. 3905–3911. The imaging device 42 includes a first input waveguide 44 connected to the optical path 18 and a second input waveguide 46 connected to the optical path 20 to direct the modulated laser beams 14 on the paths 18 and 20 into an input end of an imaging cavity 48 associated with the imaging device 42.

The imaging cavity 48 is a substantially flat electro-optical plane that provides for more optical transmission modes above those that are able to propagate through the waveguides 44 and 46. In other words, the optical transmission modes available in the input waveguides 44 and 46 are limited so that the optical signals expand into other modes in the cavity 48. The optical signals propagating through the cavity 48 are reflected off the sides of the cavity 48 and combine constructively and destructively at an output end of the cavity 48 opposite to the waveguides 44 and 46. Four optical output waveguides 52–58 are positioned at the output end of the cavity 48 at predetermined locations so that they collect constructively interfering optical waves. The phase control provided by the stretcher 36 insures that the optical beams interacting within the imager 42 interfere constructively at the locations of the output waveguides 52–58. In this embodiment, the output waveguide 52 collects a zero phase reference beam, the output waveguide 54 collects an output beam that is 180° out of phase with the reference beam at π, the output waveguide 56 collects a quadrature phase output beam at π/2, and the output waveguide 48 collects a quadrature phase output beam at 3π/2. The zero phase and π phase output beams represent the real in-phase (cosine) correlation component of the electrical signals $X_1(t)$ and $X_2(t)$, and the output beams π/2 and 3π/2 represent the imaginary quadrature phase (sine) correlation component of the electrical signals $X_1(t)$ and $X_2(t)$.

The length and width of the cavity 48 is predetermined based on the wavelength of the laser beam 14 to selectively position the output waveguides 52–58 to provide the various phased output beams at the output end of the cavity 48. Of course, the imaging device 40 can be modified to provide more than two inputs and more than four outputs to provide correlation of more input signals. In an alternate embodiment, an N×N optical star coupler, known to those skilled in the art, can be used to provide the optical correlation of two signals by collecting the power from several summations of the two signals with various relative phase shifts.

A photodetector 60–66 is provided at an end of the waveguides 52–58, respectively, opposite to the cavity 48, to sense the light output and provide an electrical signal indicative of the optical intensity for these beams. The photodetectors 60–66 provide differential envelope detection for the correlation process. The in-phase electrical output signals from the photodetectors 60 and 62 are applied to a first differential amplifier 68, and the quadrature phase electrical output signals from the photodetectors 64 and 66 are applied to a second differential amplifier 70. The differential amplifiers 68 and 70 subtract the signals from the respective photodetectors 60–66 to provide a difference output. The difference output from the amplifier 68 is applied to a first integrator 72 that integrates the subtracted signal to provide an in-phase correlation component over time, and the difference output from the amplifier 70 is applied to a second integrator 74 that adds the difference output over a predetermined time period to provide the quadrature phase correlation component of the signals $X_1(t)$ and $X_2(t)$. The summation outputs from the integrators 72 and 74 may be sampled and quantized by, for example, an analog-to-digital converter (not shown) that applies the digital signal to a digital processor that provides for further data processing of the correlation outputs for the signals $X_1(t)$ and $X_2(t)$.

The mathematical relationship that identifies the optical correlation provided by the imaging device 42 of the invention is given below. Equation (1) is a model for a 10 GHz bandwidth signal at 94 GHz, where the signal of interest X(t) is characterized in a polar representation by amplitude modulation r(t) and phase (or frequency) modulation ϕ(t) near a center radian frequency $\omega_{rf}$.

$$x(t)=r(t)\cos(\omega_{rf}t+\phi(t)) \qquad 1$$

This signal can also be expressed in a rectangular coordinate representation as shown below in Equation (2).

$$x(t)=r(t)\cos(\omega_{rf}t+\phi(t))=r(t)[\cos(\phi(t))\cos(\omega_{rf}t)-\sin(\phi(t))\sin(\omega_{rf}t)]=\alpha(t)\cos(\omega_{rf}t)-b(t)\sin(\omega_{rf}t) \qquad 2$$

This signal model is represented as consisting of two narrowband amplitude modulated signals centered at the radian frequency $\omega_{rf}$ and in quadrature with respect to each other. For convenience, the polar representation of the signal will be used below. The complex envelope representation of X(t) is useful for mathematical manipulation of the electrical signals being discussed herein and is given by equation (3).

$$\tilde{x}(t)=r(t)e^{j(\omega_{rf}1+\phi(t))} \qquad 3$$

In this equation, X(t) is the real part of the complex envelope function.

The most straight-forward method of computing the correlation between two detected RF signals is by multiplication (mixing), as described above. If the two signals $X_1(t)$ and $X_2(t)$ are mixed and then low pass filtered, the result is given in equation (4) for the complex envelope representation and in equation (5) for the real signal representation. This is the in-phase correlation of the signals $X_1(t)$ and $X_2(t)$.

$$\begin{aligned}\tilde{x}_1(t)\_\tilde{x}_2(t) &= \frac{1}{2}\left[r_1(t)e^{j(\omega_{rf}t+\Phi_1(t))}\right]\left[r_2(t)e^{j(\omega_{rf\_}t+\Phi_2(t))}\right] \\ &= \frac{r_1(t)r_2(t)}{2}e^{j(\phi_1(t)-\phi_2(t))}\end{aligned} \qquad 4$$

$$\begin{aligned}x_1(t)x_2(t) &= r_1(t)\cos(\omega_{rf}t+\phi_1(t))r_2(t)\cos(\omega_{rf}t+\phi_2(t)) \\ &= \frac{r_1(t)r_2(t)}{2}(\cos(2\omega_{rf}t+\Phi_1(t)+\Phi_2(t))+ \\ &\quad \cos(\Phi_1(t)-\Phi_2(t))) \\ &= \frac{r_1(t)r_2(t)}{2}\cos(\phi_1(t)-\phi_2(t)) \text{ after low pass filtering} \\ &= \mathrm{Re}\{\tilde{x}(t)\_\tilde{x}_2(t)\}\end{aligned} \qquad 5$$

The complex correlation consists of two parts corresponding to the in-phase and quadrature phase component of the correlation. The actual physical mixing followed by a low pass filter recovers only the in-phase component of the complex correlation. The quadrature phase component can be recovered by multiplication of the two signals $X_1(t)$ and $X_2(t)$, where one signal has been phase shifted by π/2 radian degrees. The resulting quadrature phase correlation is given by equation (6).

$$\begin{aligned}x_1(t)x_2(t) &= r_1(t)\sin(\omega_{rf}t+\phi_1(t))r_2(t)\cos(\omega_{rf}t+\phi_2(t)) \\ &= \frac{r_1(t)r_2(t)}{2}(\sin(2\omega_{rf}t+\phi_1(t)+\phi_2(t))+ \\ &\quad \sin(\phi_1(t)-\phi_2(t))) \\ &= \frac{r_1(t)r_2(t)}{2}\sin(\Phi_1(t)-\Phi_2(t)) \text{ after low pass filtering} \\ &= \mathrm{Im}\{\tilde{x}_1(t)\_\tilde{x}_2(t)\}\end{aligned} \qquad 6$$

Equation (6) is the real part of the conjugant of the result of equation (4).

The imaging device 42 performs the photonic correlation according to the invention not by multiplication of these signals, but in an interferometric manner. Equation (7) gives this mathematical representation.

$$\begin{aligned}Re\{\tilde{x}_1(t)\_\tilde{x}_2(t)\} &= |\tilde{x}_1(t)+\tilde{x}_2(t)|^2\_|\tilde{x}_1(t)-\tilde{x}_2(t)|^2 \\ Im\{\tilde{x}_1(t)\_\tilde{x}_2(t)\} &= |\tilde{x}_1(t)+j\tilde{x}_2(t)|^2\_|\tilde{x}_1(t)-j\tilde{x}_2(t)|^2\end{aligned} \qquad 7$$

In equation (7), $+X_2(t)$ is the zero phase component, $-X_2(t)$ is the $\pi$ phase component, $+jX_2(t)$ is the $\pi/2$ phase component, $-jX_2(t)$ is the $3\pi/2$ phase component. The magnitude squared operation is provided by the photodetectors 60–66. Equation (7) implies that if two optical signals can be coherently summed and differentially photodetected, it is possible to simultaneously recover the in-phase and quadrature phase components of the complex correlation over a bandwidth limited only by the physics governing the operation of the imaging device 42. Consequently, the multiple required correlators can be constructed in a wide bandwidth, integrated photonic structure that can substantially reduce the processor complexity, size and power consumption to enable the establishment of a highly functional and mobile based sensor platform.

In order to provide both the in-phase and quadrature phase correlation components simultaneously, as described above, the modulators 22 and 24 need to provide a single sideband suppressed carrier modulation. The sideband filters 30 and 32 are provided to filter one of the sidebands. For a single sideband suppressed carrier modulation, the complex real and imaginary correlation components are determined by differential detection of the appropriately phased optical signals, as given by equations (8) and (9) below.

$$((I(t)|)_{\theta_{s=0}} - I(t)|)_{\theta_{s=\pi}} = \frac{P}{2}\left(\frac{\pi}{v_\pi}\right)^2 r_1(t)r_2(t)\cos(\phi_1(t)-\phi_2(t)) = P\left(\frac{\pi}{v_\pi}\right)^2 \mathrm{Re}\{\tilde{x}_1(t)\cdot\tilde{x}_2(t)\} \quad 8$$

$$\left((I(t)|)_{\theta_s=\frac{\pi}{2}} - I(t)\right|\Big)_{\theta_s=-\frac{\pi}{2}} = \frac{\pi}{-2} = \frac{P}{2}\left(\frac{\pi}{v_\pi}\right)^2 r_1(t)r_2(t)\sin(\phi_1(t)-\phi_2(t)) = P\left(\frac{\pi}{v_\pi}\right)^2 \mathrm{Im}\{\tilde{x}_1(t)\cdot\tilde{x}_2(t)\} \quad 9$$

Thus, both of the in-phase and quadrature phase components can be determined simultaneously. The results of equations (5) and (6) include an additional gain factor of 10 that varies with the optical power level and the modulator $v_\pi$.

If it is not possible or desirable to suppress one sideband, a double sideband suppressed carrier modulation could be used. The results of the differential detection for this modulation are given in equations (10) and (11). The signal is detected twice for the real part of the complex correlation, but the real and imaginary parts of the complex correlation cannot be determined simultaneously. A 90° hybrid splitter and a separate photonic correlation device, as well as low pass filtering, would be required.

$$((I(t)|)_{\theta_{s=0}} - I(t)|)_{\theta_{s=\pi}} = P\left(\frac{\pi}{v_\pi}\right)^2 r_1(t)r_2(t)\{\cos(\phi_1(t)-\phi_2(t)) + \cos(2\omega_{rf}t + \phi_1(t)+\phi_2(t))\} = P\left(\frac{\pi}{v_\pi}\right)^2 \mathrm{Re}\{\tilde{x}_1(t)\cdot\tilde{x}_2(t)\} \quad (10)$$

after low pass filtering $$\left((I(t)|)_{\theta_s=\frac{\pi}{2}} - I(t)\right|\Big)_{\theta_s=-\frac{\pi}{2}} = 0 \quad (11)$$

If the carrier is not suppressed, then a double sideband with carrier and single sideband with carrier modulation can be provided, as defined in equation (12).

$$I(t)|_{\theta_s=0} - I(t)|_{\theta_s=\pi} = P\left(\frac{\pi}{v_\pi}\right)^2\left[\frac{v_\pi^2}{8} + \frac{r_1(t)r_2(t)}{2}\cos(\phi_1(t)-\phi_2(t))\right] \quad (12)$$

-continued after low pass filtering $$= P\left(\frac{\pi}{v_\pi}\right)^2\left[\frac{v_\pi^2}{8} + \mathrm{Re}\{\tilde{x}_1(t)\cdot\tilde{x}_2(t)\}\right]$$

$$I(t)|_{\theta_{s=\frac{\pi}{2}}} - I(t)\Big|_{\theta_s=-\frac{\pi}{2}} = P\left(\frac{\pi}{v_\pi}\right)^2 \mathrm{Im}\{\tilde{x}_1(t)\cdot\tilde{x}_2(t)\}$$

For a double-sideband suppressed carrier modulation, the signal must be split to provide separate modulations to get the in-phase and quadrature phase correlation components. For a modulation with carrier, both components of the complex correlation can be determined, but the presence of the optical carrier results in a bias term that is generally undesirable as it can work to saturate the photodetectors 60–66. This or a similar type of bias is common to some correlation techniques that employs acoustal optic modulators, photorefractive materials, or cascaded integrated optic Mach-Zehnder modulators. From the above results it can be seen that the ideal modulation is one in which the carrier is suppressed and one sideband is removed from the signal as the amount of required hardware is reduced and bias components of the detected signal are eliminated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical system for correlating electrical input signals, said system comprising:

an optical source generating an optical beam;

an optical splitter responsive to the optical beam and splitting the beam into a first split beam traveling along a first optical path and a second split beam traveling along a second optical path;

a first modulator positioned in the first optical path and being responsive to the first split beam and a first electrical input signal, and a second modulator positioned in the second optical path and being responsive to the second split beam and a second electrical input signal, said first modulator modulating the first split beam with the first input signal and said second modulator modulating the second split beam with the second input signal; and a multi-mode optical imaging device responsive to the first modulated beam and the second modulated beam, said imaging device combining the first and second modulated beams and generating in-phase and quadrature phase optical output signals.

2. The system according to claim 1 wherein the first and second modulated beams interfere with each other within the imaging device in a manner that generates two in-phase outputs and two quadrature phase outputs at constructively interfering locations within the imaging device.

3. The system according to claim 1 wherein the first modulator modulates the first split beam with the first electrical input signal and the second modulator modulates the second split beam with the second electrical input signal by a modulation format selected from the group consisting of a single sideband suppressed carrier modulation, a double sideband suppressed carrier modulation, a single sideband with carrier modulation, and a double sideband with carrier modulation.

4. The system according to claim 3 wherein the system simultaneously provides both an in-phase correlation component and a quadrature phase correlation component for the single sideband suppressed carrier modulation format.

5. The system according to claim 2 further comprising four photodetectors, wherein a first photodetector is responsive to one of the in-phase outputs, a second photodetector is responsive to the other in-phase output, a third photodetector is responsive to one of the quadrature phase outputs and a fourth photodetector is responsive to the other quadrature phase output, and wherein the four photodetectors generate four electrical signals indicative of the optical output signals from the optical imaging device.

6. The system according to claim 5 further comprising a first differential amplifier responsive to the electrical signal from the first and second photodetectors and a second differential amplifier responsive to the electrical signals from the third and fourth photodetectors, said first differential amplifier subtracting the in-phase electrical signals and generating a first subtracted output and said second differential amplifier subtracting the two quadrature phase electrical signals and generating a second subtracted output.

7. The system according to claim 6 further comprising a first integrator and a second integrator, said first integrator receiving and accumulating the first subtracted output and said second integrator receiving and accumulating the second subtracted output.

8. The system according to claim 1 wherein the first and second modulators are Mach-Zehnder interferometer modulation devices.

9. The system according to claim 1 further comprising a calibration device positioned in the first path, said calibration device also being responsive to a feedback phase control signal that is indicative of the phase difference between the first modulated split beam and the second modulated split beam in the imaging device, said calibration device adjusting the first split beam to be in phase with the second split beam.

10. The system according to claim 1 further comprising a first filter positioned in the first path and a second filter positioned in the second path, said first filter filtering a sideband of the first split beam and the second filter filtering a sideband of the second split beam.

11. The system according to claim 1 wherein the system provides phase correlation for a passive millimeterwave imaging system.

12. An optical device for correlating electrical input signals, said device comprising:

a first modulator responsive to a first optical beam and a first electrical input signal, said first modulator modulating the first optical beam with the first electrical input signal to generate a first modulated optical beam;

a second modulator responsive to a second optical beam and a second electrical input signal, said second modulator modulating the second optical beam with the second electrical input signal to generate a second modulated optical beam; and a multi-mode optical imaging device being responsive to the first modulated optical beam and the second modulated optical beam, said first and second modulated beams interfering with each other within the imaging device and generating a zero phase optical output signal, a $\pi$ phase optical output signal, a $\pi/2$ phase optical output signal and a $3\pi/2$ phase optical output signal, said zero phase and $\pi$ phase output signals representing an in-phase correlation component and the $\pi/2$ phase and $3\pi/2$ phase output signals representing a quadrature phase correlation component.

13. The device according to claim 12 wherein the first modulator and the second modulator provide single sideband suppressed carrier modulation, and the imaging device simultaneously generates the in-phase correlation component and the quadrature phase correlation component.

14. The system according to claim 13 wherein the first and second modulators are Mach-Zehnder interferometer modulation devices.

15. The system according to claim 12 wherein the first modulator modulates the first optical beam with the first electrical input signal and the second modulator modulates the second optical beam with the second electrical input signal by a modulation format selected from the group consisting of a single sideband suppressed carrier modulation, a double sideband suppressed carrier modulation, a single sideband with carrier modulation, and a double sideband with carrier modulation.

16. The device according to claim 12 further comprising a plurality of photodetectors where each photodetector is responsive to one of the phase output signals from the imaging device and generating an electrical signal indicative of the phase output signal.

17. The device according to claim 16 further comprising a first differential amplifier responsive to the electrical signals representing the in-phase correlation component and a second differential amplifier responsive to the electrical signals representing the quadrature phase correlation component.

18. The device according to claim 12 further comprising a calibration device responsive to the first modulated beam, said calibration device also being responsive to a feedback phase control signal that is indicative of the phase difference between the first modulated beam and the second modulated beam in the imaging device, said calibration device adjusting the first modulated beam to be in phase with the second modulated beam.

19. A method of correlating two or more electrical signals, said method comprising the steps of:

generating an optical beam having a predetermined wavelength;

splitting the optical beam into a first split beam propagating along a first optical path and a second split beam propagating along a second optical path;

applying the first split beam to a first modulator positioned in the first optical path and applying the second split beam to a second modulator positioned in the second optical path;

applying a first electrical input signal to the first modulator and applying a second electrical input signal to the second modulator;

modulating the first split beam with the first electrical input signal to generate a first modulated beam and modulating the second split beam with the second electrical input signal to generate a second modulated beam; and applying the first modulated beam and the second modulated beam to a multi-mode optical imaging device to interfere and combine the first and second modulated beams and generate two optical output signals that are in-phase and two optical output signals that are in quadrature phase.

20. The method according to claim 19 wherein the step of modulating includes using a modulation format selected from the group consisting of a single sideband suppressed carrier modulation, a double sideband suppressed carrier modulation, a single sideband with carrier modulation, and a double sideband with carrier modulation.

21. The method according to claim 19 wherein the step of modulating includes employing a single sideband suppressed carrier modulation format to simultaneously provide both an in-phase correlation component and a quadrature phase correlation component.

22. The method according to claim 19 further comprising the step of providing a plurality of photodetectors that generate electrical signals indicative of the two in-phase optical signals and the two quadrature phase optical signals.

23. The method according to claim 22 further comprising the step of providing a first differential amplifier receiving and subtracting the in-phase electrical signals and a second differential amplifier receiving and subtracting the quadrature phase electrical signals.

24. The method according to claim 19 further comprising the step of providing a calibration device responsive to a feedback control signal that causes the first modulated beam to be in phase with the second modulated beam.

* * * * *